US006863878B2

(12) United States Patent
Klepper

(10) Patent No.: US 6,863,878 B2
(45) Date of Patent: Mar. 8, 2005

(54) METHOD AND APPARATUS FOR PRODUCING SYNTHESIS GAS FROM CARBONACEOUS MATERIALS

(76) Inventor: Robert E. Klepper, 7957 Fenton, Arvada, CO (US) 80003

( * ) Notice: Subject to any disclaimer, the term of this patent is extended or adjusted under 35 U.S.C. 154(b) by 202 days.

(21) Appl. No.: 10/186,771

(22) Filed: Jul. 1, 2002

(65) Prior Publication Data

US 2003/0008928 A1 Jan. 9, 2003

Related U.S. Application Data

(60) Provisional application No. 60/303,756, filed on Jul. 5, 2001.

(51) Int. Cl.[7] .............................................. C01B 3/26
(52) U.S. Cl. ..................... 423/650; 48/197 R; 48/203; 252/373; 422/189; 422/200; 423/418.2
(58) Field of Search ................... 252/373; 48/197 R, 48/203; 422/189, 200; 423/418.2, 650

(56) References Cited

U.S. PATENT DOCUMENTS 2,772,954 A * 12/1956 Jequier ........................ 48/202

| 3,971,639 A | 7/1976 | Matthews |
| 4,017,272 A | 4/1977 | Anwer et al. |
| 4,298,453 A | 11/1981 | Schoennagel et al. ........ 208/10 |
| 4,591,362 A | 5/1986 | Yudovich et al. ............. 48/197 |
| 5,695,532 A | 12/1997 | Johnson et al. ............... 48/203 |
| 6,155,751 A | 12/2000 | Lane et al. |

FOREIGN PATENT DOCUMENTS

| DE | 972 345 | 7/1959 |
| EP | 0 067 580 | 12/1982 |
| GB | 0 357 424 | 9/1931 |
| GB | 2 068 014 | 8/1981 |

* cited by examiner

*Primary Examiner*—Stanley S. Silverman
*Assistant Examiner*—Maribel Medina
(74) *Attorney, Agent, or Firm*—Wood, Herron & Evans, L.L.P.

(57) ABSTRACT

A method of producing syn gas from biomass or other carbonaceous material utilizes a controlled devolatilization reaction in which the temperature of the feed material is maintained at less than 450° F. until most available oxygen is consumed. This minimizes pyrolysis of the feed material. The method and apparatus utilizes the formed synthesis gas to provide the energy for the necessary gasification. This provides for a high purity syn gas and avoids production of slag.

14 Claims, 1 Drawing Sheet

METHOD AND APPARATUS FOR PRODUCING SYNTHESIS GAS FROM CARBONACEOUS MATERIALS

RELATED APPLICATION

This application is a continuation application of Provisional Application Ser. No. 60/303,756, filed Jul. 5, 2001, which is incorporated herein in its entirety by reference.

BACKGROUND OF THE INVENTION

Carbonaceous feed material such as coal, wood chips and other biomass, and the like, have been used to produce synthesis gas which is carbon monoxide and hydrogen. The syn gas reaction is a redox reaction in which steam is combined with carbon at elevated temperatures to produce carbon monoxide and hydrogen. The reaction generally occurs at greater than 1000° F. Generally, the carbonaceous starting material includes oxygen which at elevated temperatures, i.e., greater than 450° F., will react with the carbon and pyrolysis will occur. This is an exothermic reaction. Most syn gas production has utilized the heat generated in this portion of the reaction to fuel the subsequent gasification.

Unfortunately, the pyrolysis reaction has several undesired results. Primarily it produces carbon dioxide which must be removed. Further, it produces large amounts of ash and further creates slag. Basically, it raises the temperature of the feed material to above the melting point of the ash, forming slag. Slag is unusable and must be disposed.

SUMMARY OF THE INVENTION

The present invention is premised on the realization that purer syn gas without significant amounts of carbon dioxide can be produced by controlling the oxidation of the feed material. More particularly, the present invention keeps the temperature of the feed material to less than 450° F. (the temperature at which combustion will occur) until a substantial portion of the oxygen has reacted with more reactive material in the feed such as hydrocarbons and the like. Once the available oxygen has been reacted at below combustion temperature, the feed material temperature is raised to a higher temperature, for example 650° F., prior to combination with super heated stream and subsequent rise in temperature to react with the carbonaceous feed material and produce carbon monoxide and hydrogen, i.e., syn gas.

The apparatus of the present invention utilizes the formed syn gas to provide the energy necessary to cause the oxygen to react in the feed and to gasify the carbon, thus enabling one to carefully control reaction temperature at all stages. This allows one to prevent formation of slag, control ash formation and improve the purity of the formed gas. The objects and advantages of the present invention will be further appreciated in light of the following detailed descriptions and drawings in which:

BRIEF DESCRIPTION OF THE DRAWING

The FIGURE is a diagrammatic depiction of the apparatus and method of the present invention.

DETAILED DESCRIPTION

Figure 1:
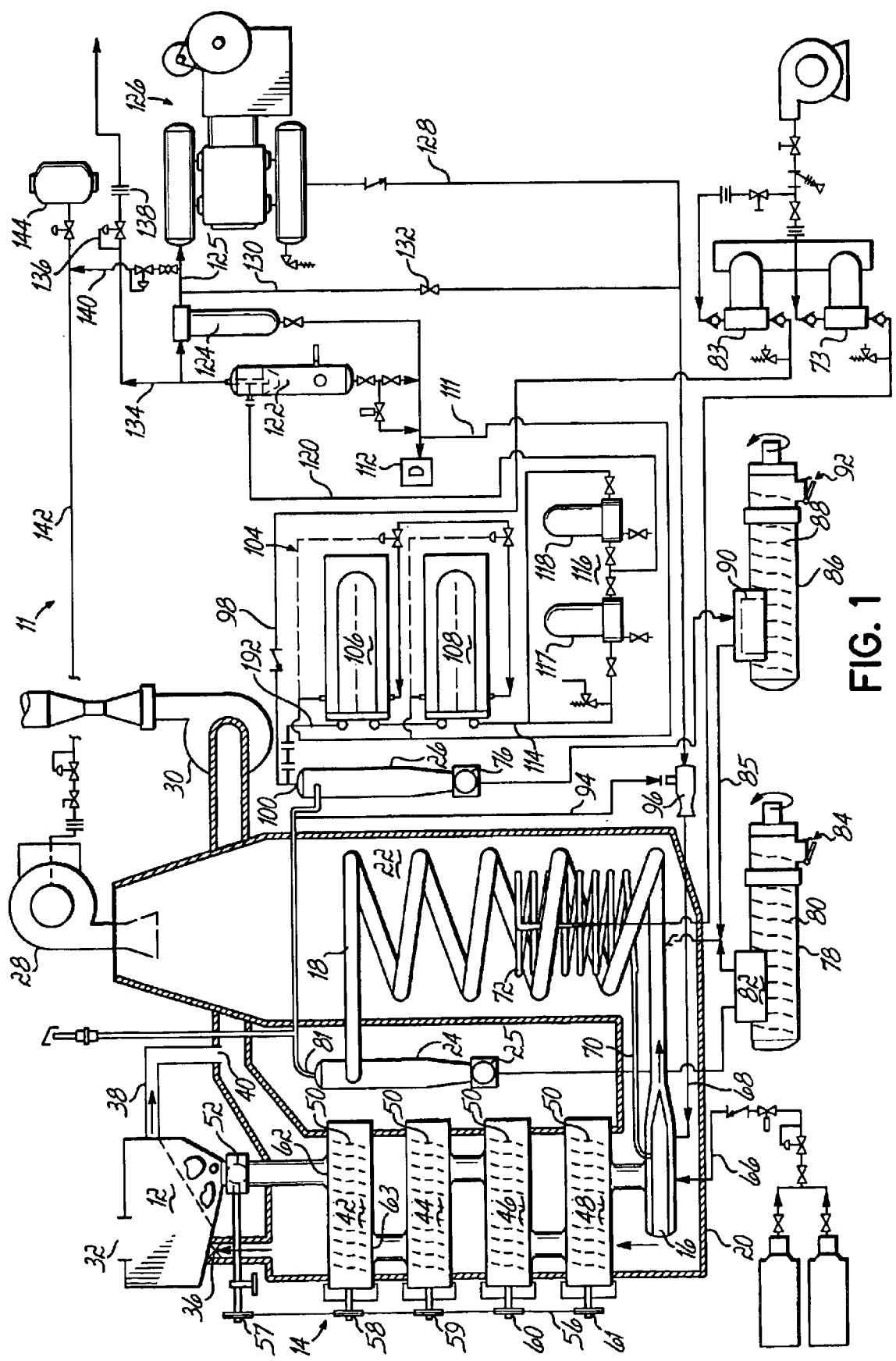

As shown in the drawing, the reactor 11 used in the present invention includes a feed hopper 12 which introduces material into a devolatilization section 14. The material from the devolatilization section 14 is directed to a cyclone feeder 16, which adds steam and directs this through coils 18 that are located in a burner section 22 of furnace 20. The heated coils 18 lead to first and then second cyclone separators 24,26 which separate gas from ash. The ash is collected for further use.

As shown in the drawings, the devolatilization section 14 is also located in furnace 20 downstream of burner section 22. A forced draft burner 28 is used to heat the burner section 22. The exhaust gases are then directed through the furnace 20 and around the devolatilization section 14 and pulled from the unit by an induced draft blower 30.

The feed hopper 12 is sealed and includes an inlet section 32 and a delumper (not shown). Gas is introduced from the furnace section 22 through valve 36 to reduce moisture and promote flow. This gas is then exhausted back into an outlet line 38 directed to the induced draft blower 30 through line 40. The feed hopper 12 is connected to the devolatilization section 14 which, as shown, is a series of four cylindrical reaction chambers 42,44,46,48, each of which include internal auger 50. A sealed valve 52 is positioned between the feed hopper 14 and the first cylindrical section 42 of the devolatilization section 14. This valve is a one-way sealed valve, basically a rotating cup which directs feed material into the devolatilization section 14. All the augers 50 and the feed valve 52 are operated by a single motor (not shown) which drives chain 56 in turn rotating sprockets 57–61 and causing the valve 52 and augers 50 to rotate. The first section 42 has an inlet 62 on the right side leading to an outlet 63 on the second side. Gravity directs material from one section to the next. This goes back and forth until the fourth and final section 48 is directed to a pneumatic conveyor such as a cyclone feeder 16.

The cyclone feeder 16 can be any typical cyclone feeder. One particular product is described in U.S. Pat. No. 6,155,751 assigned to Ecotech, the disclosure of which is hereby incorporated by reference. The cyclone feeder 16 has three gas inlets, a nitrogen purge inlet 66 simply for safety purposes and shut down purposes, a syn gas inlet 68 and a steam inlet 70.

Steam is created by super-heated steam coils 72 which run inside burner section 22 of furnace 20. Steam is pumped from pump 73 into these coils 72 where the heat from furnace 20 heats the steam to about 1500° F. where it is directed into the cyclone feeder 16. The cyclone feeder 16 then combines the product from the devolatilization section 14 with steam and directs this through reaction coils 18. Syn gas is added as a diluent to maintain gas velocity.

The temperature in the reaction coils 18 should be from about 1300°–1800° F. In the reaction coils 18, the carbonaceous product from the devolatilization section will react with the seam to form carbon monoxide and hydrogen. The reaction coils 18 lead to the first cyclone separator 24. This is designed to remove larger ash and unreacted particles. The outlet 25 of the first cyclone separator 24 leads to the first ash collector 78 which is a cylinder with an auger 80. The auger 80 directs ash from the inlet 82 to the outlet 84 as the ash cools.

The first cyclone separator 24 also has a first gas outlet 83 which leads to second cyclone separator 26 which removes finer ash and directs this to the second ash collector 86. This collector 86 also includes an auger 88 which directs ash from inlet 90 to outlet 92. Both outlets 25 and 76 are one-way feeder valves similar to valve 52 that allow pressure to be maintained in the system.

The syn gas outlet 81 from the first cyclone separator 24 tees off through line 94 to an eductor 96 which directs syn gas back into the cyclone feeder 16. This controls the gas velocities to ensure that the reactants move quickly through the reaction coils 18, generally at a minimum rate of about 2,000 feet per minute.

Water is added through line 98 to reduce the gas temperature to 800° F. at outlet 100 from separator 26. The syn gas flows from the second cyclone separator 26 through line 192 to cooling section 104 which, as shown, includes first and second quenching coolers 106,108. Gas flow line 192 goes through the first quenching cooler 106 and is cooled to about 350° F. Then the gas passes through the second quenching cooler 108 and is cooled to about 130° F. The cooling water is then directed through line 111 into a drain 112.

The syn gas flows through line 114 to filter section 116. As shown, this includes first and second filters 117,118. These are basically redundant filters which allow them to be switched back and forth for alternate use. Syn gas flows from the filter section 116 through lines 120 to a coalescing water cyclone 122. This removes the remaining water which is directed to drain 112. The de-watered gas moves through a coalescing filter 124 and then via line 125 to a single stage compressor 126 which operates at about 150 psi greater than the cyclone feeder 16. An output line 128 from the compressor leads to eductor 96. The compressor provides the energy for the eductor.

The outlet line 125 from the coalescing filter also divides at line 130 and leads to a valve 132. This valve 132 is open during the start of the compressor 126 to reduce back pressure allowing the compressor to start up. Once the start up is initiated, valve 132 is closed. A second line 134 from the water cyclone separator 122 relieves back pressure. Line 134 is also the collection line for the produced syn gas. It includes a flow meter 136 and product sample port 138. This leads to a collector (not shown).

A syn gas fuel line 140 is directed from line 125 up to line 142 which is directed to the forced draft burner providing the fuel for the burner. Upstream is a propane tank 144 which provides start up fuel for the process. Preferably the reactor coils and devolatilization cylinder are refractory alloys such as 800 HT Incalloy with a rated capacity of 450 psi.

The operation of this system is carefully controlled to prevent pyrolysis of the feed material providing a higher quality product and a finer ash material. The feed material can be, for example, coal or any biomass, such as animal waste or wood chips. In particular, in the process of the present invention, the feed is introduced into the feed hopper where it is dried. The product will have perhaps 30%–40% moisture by weight when it is introduced into the initial devolatilization section 14.

The forced draft burner 28 is ignited initially using auxiliary gas source 144. This will heat the burner section 22 and the exhaust gas will then pass through the reactor around the individual devolatilization cylinders 42–48. The temperature in the fourth devolatilization cylinder 48 will be higher than the temperature in the first devolatilization section 42. Each of these reactors is a separate reaction zone with each subsequent reaction zone heated to a higher temperature than the preceding reaction zone. This allows for controlled reaction of oxygen in the feed material and enables one to prevent pyrolysis by controlling the exhaust gas flow over the devolatilization section. This is controlled primarily by controlling the speed at which the induced draft blower 30 operates.

It is preferable to have the first devolatilization section at around 100° F. with the final devolatilization section at 650° F. or higher. Pyrolysis occurs at about 450° F. Therefore, it is desirable to have most of the free oxygen reacted in the devolatilization section prior to reaching 450° F. Obviously, some small percentage of pyrolysis can occur. But one must minimize pyrolysis to prevent the exothermic oxidation from getting out of control.

The end product exiting from the devolatilization section is primarily char. This is combined with steam and syn gas basically as a diluent and transport medium in the cyclone feeder 16. The ratio of steam to char should be about 1 to 1 on a mole basis calculating the char primarily as carbon. Obviously, no oxygen is added. The temperature of the steam when added should be around 1500°–1800° F.

To maintain the velocity in the cyclone feeder 16, the eductor 96 is used to force syn gas through the reactor. This is generally about three-fourths of the total flow volume passing through the reaction coils 18. Syn gas is added as opposed to additional steam to reduce waste water which must be removed from the system. The char and steam passes through the reaction coils in about 5 seconds and is directed to first cyclone separator 24. This removes ash through a one-way valve 25 at the bottom of the separator and directs it into the ash collector 78. This includes an auger 80 which allows the ash to cool prior to being removed from hopper door 84. A vent 85 is provided back into the furnace 20 to vent off gases when the hopper door is open. Likewise, the second cyclone separator operates in the same manner. Again, its purpose is to remove additional finer ash.

In order to prevent formation of soot, it is important to reduce the temperature of the syn gas to about 800° F. as it is removed from the second cyclone separator 26. Therefore, quench water pump 83 introduces water at the top of the cyclone separator 26 to reduce the gas temperature to less than 800° F. The gas then passes through line 192 which may be provided with a Shift Reactor (not shown). This then passes through to the first cooling chamber 106 which cools the syn gas to 350° F. (utilizing quench water) to a second cooler 108 which reduces the temperature to 130°–150° F. and then through filter section 116.

The produced gas once filtered to remove water will be a relatively high purity syn gas having a hydrogen to carbon monoxide molar ratio of approximately 1:1.

The present invention has many different advantages. Basically, any carbonaceous feed material will be suitable for the present invention. If necessary, additional chemicals can be added to the feed material such as catalysts to enhance syn gas production or other materials to remove undesirable matter. For example, either pot ash or dolomite clay can be added to react with the sulphur permitting it to be removed with the ash.

As the present invention reduces pyrolysis and keeps the overall temperature of any formed ash at less than the slag forming temperature, a fine particulate ash is formed which in many cases may have commercial value. Particularly, with respect to livestock waste, various nutrients can be recovered from the ash. This is effected by utilizing the syn gas as the heat source for the reaction as opposed to utilizing oxidation of the feed material to form the requisite heat.

This has been a description of the present invention along with the preferred method of practicing the present invention. However, the invention itself should only be defined by the appended claims

I claim:

1. A method of forming syn gas comprising devolatilizing a feed material in a controlled manner at a first temperature low enough to react oxygen in said feed material without causing pyrolysis thereby forming a char; subsequently combining said char with steam and passing said steam and char through a heated reaction vessel at a second higher temperature to form syn gas.

2. The method claimed in claim 1 wherein heat is provided to said heated reaction vessel by combustion of produced syn gas.

3. The method claimed in claim 2 wherein said char and steam are forced through said reaction vessel by a cyclone feeder and wherein diluent syn gas is added to said char and steam in said cyclone feeder.

4. The method claimed in claim 2 further comprising directing heated air from said combustion of produced syn gas to a feed hopper.

5. The method claimed in claim 1 wherein said feed is devolatilized in a series of sealed devolatilization reaction zones and each subsequent devolatilization reaction zone is heated to a higher temperature than the preceding devolatilization reaction zone.

6. The method claimed in claim 5 wherein said devolatilization reaction zones are heated by exhaust gas produced by the combustion of produced syn gas wherein said exhaust gas is circulated around the exterior of said devolatilization zones.

7. An apparatus to produce syn gas comprising a devolatilization section in communication with a gasification section;

wherein said devolatilization section includes a sealable feed material inlet directed towards a plurality of devolatilization zones leading to said gasification section;

wherein said gasification section is located in a heated reaction zone;

a heater directed to force heated air through said reaction zone;

a steam inlet into said reaction zone downstream of said devolatilization section;

an exhaust directing said heated air from said reaction zone into indirect contact with said devolatilization section; and a feeder adapted to force reactants through said reaction zone.

8. The apparatus claimed in claim 7 wherein said heater comprises a burner and wherein said burner is connected to a syn gas output line.

9. The apparatus claimed in claim 7 wherein said devolatilization section includes a first devolatilization zone in communication with said feed material inlet and a last devolatilization zone in communication with said gasification section.

10. The apparatus claimed in claim 9 wherein each of said devolatilization zones includes a rotating auger adapted to direct material from an inlet to an outlet, and wherein said first devolatilization zone communicates with said feed material inlet by a rotating feed mechanism.

11. The apparatus claimed in claim 10 further comprising means to synchronize rotation of said augers and said feed mechanism.

12. The apparatus claimed in claim 9 wherein said feeder includes a steam inlet and a char inlet from said last devolatilization reaction zone.

13. The apparatus claimed in claim 12 wherein said feeder is a cyclone feeder and said gasification section comprises an elongated reaction coil.

14. The apparatus claimed in claim 13 further comprising an eductor adapted to direct produced syn gas to said cyclone feeder to provide required flow velocity in said reaction coils.

* * * * *